United States Patent
Burr et al.

(10) Patent No.: US 8,051,298 B1
(45) Date of Patent: Nov. 1, 2011

(54) INTEGRATED FINGERPRINTING IN CONFIGURATION AUDIT AND MANAGEMENT

(75) Inventors: Jonathon A. Burr, Overland Park, KS (US); John D. Felton, Leawood, KS (US); Michael J. Taylor, Liberty, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1245 days.

(21) Appl. No.: 11/288,705

(22) Filed: Nov. 29, 2005

(51) Int. Cl.
*G06F 11/30* (2006.01)
(52) U.S. Cl. ............ 713/187; 726/22; 717/170
(58) Field of Classification Search .......... None
See application file for complete search history.

(56) References Cited

U.S. PATENT DOCUMENTS

| | | | |
|---|---|---|---|
| 6,006,034 A * | 12/1999 | Heath et al. ............... | 717/170 |
| 6,149,522 A * | 11/2000 | Alcorn et al. .............. | 463/29 |
| 6,405,364 B1 | 6/2002 | Bowman-Amuah | |
| 6,425,125 B1 * | 7/2002 | Fries et al. ................. | 717/168 |
| 6,601,234 B1 | 7/2003 | Bowman-Amuah | |
| 6,640,244 B1 | 10/2003 | Bowman-Amuah | |
| 6,671,818 B1 | 12/2003 | Mikurak | |
| 6,694,329 B2 | 2/2004 | Murray | |
| 6,865,565 B2 | 3/2005 | Rainsberger et al. | |
| 6,904,593 B1 | 6/2005 | Fong et al. | |
| 6,964,044 B1 | 11/2005 | Hudson et al. | |
| 6,990,660 B2 * | 1/2006 | Moshir et al. ............. | 717/171 |
| 7,100,195 B1 | 8/2006 | Underwood | |
| 7,664,756 B1 | 2/2010 | Felton et al. | |
| 2003/0053448 A1 * | 3/2003 | Craig et al. ............... | 370/353 |
| 2003/0055749 A1 | 3/2003 | Carmody et al. | |
| 2003/0212643 A1 | 11/2003 | Steele et al. | |
| 2003/0212898 A1 * | 11/2003 | Steele et al. .............. | 713/200 |
| 2004/0003390 A1 * | 1/2004 | Canter et al. .............. | 717/178 |
| 2004/0210883 A1 * | 10/2004 | Diedrich et al. ........... | 717/145 |
| 2004/0259633 A1 * | 12/2004 | Gentles et al. ............. | 463/29 |
| 2005/0033728 A1 * | 2/2005 | James et al. .............. | 707/1 |
| 2005/0091535 A1 * | 4/2005 | Kavalam et al. ........... | 713/201 |
| 2005/0132357 A1 * | 6/2005 | Shell et al. ............... | 717/174 |
| 2005/0171961 A1 * | 8/2005 | Culbreth et al. ........... | 707/100 |
| 2005/0257214 A1 * | 11/2005 | Moshir et al. ............. | 717/171 |
| 2006/0026304 A1 * | 2/2006 | Price ....................... | 710/8 |
| 2006/0059253 A1 | 3/2006 | Goodman et al. | |
| 2006/0106781 A1 * | 5/2006 | Mori et al. ................ | 707/3 |
| 2006/0259897 A1 * | 11/2006 | Zorn et al. ................ | 717/118 |
| 2007/0044160 A1 * | 2/2007 | Ishibashi .................. | 726/34 |
| 2007/0198609 A1 * | 8/2007 | Black et al. ............... | 707/204 |
| 2007/0214453 A1 * | 9/2007 | Dive-Reclus .............. | 717/175 |

OTHER PUBLICATIONS

Hemmat, Merzad, "Defining and Sizing Feasible Approaches to Business Needs Within an Integrated Development Process," filed May 5, 2003, U.S. Appl. No. 10/429,615, Specification (33 pgs.) and Drawings (3 sheets).

Hemmat, Merzad, "Method for Discovering Functional and System Requirements in an Integrated Development Process," filed Aug. 18, 2003, U.S. Appl. No. 10/643,334, Specification (29 pgs.) and Drawings (4 sheets).

(Continued)

*Primary Examiner* — Eleni Shiferaw
*Assistant Examiner* — Luu Pham

(57) ABSTRACT

A system and computer implemented method for identifying active applications in an enterprise computing system is provided. The method includes defining a plurality of fingerprints for an application. A first fingerprint is related to a directory structure associated with the application. A second fingerprint is related to checking memory of at least some of the enterprise computing systems for data related to the application. The method includes searching the enterprise computing system for at least one fingerprint. The method includes when a fingerprint is found, identifying the application associated with the fingerprint as active.

20 Claims, 6 Drawing Sheets

OTHER PUBLICATIONS

Felton, John D., "Application Management Database with Personnel Assignment and Automated Configuration," filed Aug. 2, 2005, U.S. Appl. No. 11/195,543, Specification (22 pgs.) and Drawings (3 sheets).

Felton, John D., Configuration Management Database Implementation with End-to-End Cross-Checking System and Method, filed Oct. 7, 2005, U.S. Appl. No. 11/245,593, Specification (31 pgs.) and Drawings (6 sheets).

Felton, John D., et al.., "Configuration Management Database Implementation with End-to-End Cross-Checking System and Method," filed Oct. 7, 2005, U.S. Appl. No. 11/245,593.

Office Action dated Dec. 19, 2007 (19 pages), U.S. Appl. No. 11/245,593, filed Oct. 7, 2005.

Final Office Action dated Jun. 20, 2008 (21 pages), U.S. Appl. No. 11/245,593, filed Oct. 7, 2005.

Advisory Action dated Sep. 8, 2008 (3 pages), U.S. Appl. No. 11/245,593, filed Oct. 7, 2005.

Office Action dated Oct. 29, 2008 (18 pages), U.S. Appl. No. 11/245,593, filed Oct. 7, 2005.

Final Office Action dated Apr. 27, 2009 (25 pages), U.S. Appl. No. 11/245,593 filed Oct. 7, 2005.

Advisory Action dated Jul. 7, 2009 (3 pages), U.S. Appl. No. 11/245,593, filed Oct. 7, 2005.

Notice of Allowance Sep. 30, 2009 (24 pages), U.S. Appl. No. 11/245,593, filed Oct. 7, 2005.

* cited by examiner

INTEGRATED FINGERPRINTING IN CONFIGURATION AUDIT AND MANAGEMENT

CROSS-REFERENCE TO RELATED APPLICATIONS

This application has subject-matter related to U.S. patent application Ser. No. 11/195,543, entitled "Application Management Database With Personnel Assignment and Automated Configuration Application," by John D. Felton, Scott D. Perrea, and Michael J. Taylor, filed Aug. 2, 2005, and to U.S. patent application Ser. No. 11/245,593, entitled "Configuration Management Database Implementation With End-to-End Cross-Checking System and Method," by John D. Felton, Scott D. Perrea, and Michael J. Taylor, filed Aug. 2, 2005, and to U.S. patent application Ser. No. 10/429,615, filed May 5, 2003 and entitled "Defining and Sizing Feasible Approaches to Business Needs Within an Integrated Development Process", and to U.S. patent application Ser. No. 10/643,334, filed Aug. 18, 2003 and entitled "Method For Discovering Functional and System Requirements In An Integrated Development Process", all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a system and method for managing an enterprise, and more particularly, but not by way of limitation, to a method and system for fingerprinting of computer applications in a configuration auditing and management system.

BACKGROUND OF THE INVENTION

The information age and the advent of the Internet have changed the way people connect, the way information is shared, and how people conduct business. Managing information technology assets and the business carried out amongst the assets has become an increasingly daunting task. Enterprise assets include computer-based entities such as general-purpose computers, servers, mobile devices, all of the systems of computer and telecommunication networks and their components (hardware and software), as well as the human resources and services related to these systems. Assets may contain vast numbers of applications and information files. Assets are constantly added and removed from a networked enterprise. Assets also change ownership and change physical locations. The managing of asset change and/or the configuration change of the assets presents unique challenges.

SUMMARY OF THE INVENTION

An embodiment of the present disclosure provides a system and computer implemented method for identifying active applications in an enterprise computing system. The method includes defining a plurality of fingerprints for an application. A first fingerprint is related to a directory structure associated with the application. A second fingerprint is related to checking memory of at least some of the enterprise computing systems for data related to the application. The method includes searching the enterprise computing system for at least one fingerprint. The method includes when a fingerprint is found, identifying the application associated with the fingerprint as active. In one embodiment, a third fingerprint may be searched, the third finger print may include an analysis of any data that has been modified, such as data recently modified, or modifications matching certain criteria, or other modifications that are defined as comprising a third fingerprint.

In one embodiment, a system for identifying applications in an enterprise computing system is provided. The system comprises a data store, a processor, a first and second fingerprint files, and a component. The first fingerprint file identifies an internal application. The first and second fingerprint files are maintained by the data store. The second fingerprint file is associated with a third-party application. The second fingerprint file includes information indicating that the third-party application is active on the enterprise computing system. The information in the second fingerprint file includes a directory structure associated with the application, data to be searched for in the memory of one or more of the enterprise computer systems, and data store modification information associated with the application. The component executes on the processor to scan one or more of the enterprise computing systems for the first fingerprint file and to scan for the information in the second fingerprint file to identify active applications on the enterprise.

In still other embodiments, a method of auditing an enterprise computer system for applications is provided. The method includes defining a plurality of fingerprints for an application. A first fingerprint is related to a directory structure associated with the application, and a second fingerprint is related to checking memory on at least some of the enterprise computing systems for data related to the application. The method also includes searching the enterprise computing system for the plurality of fingerprints.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1A:
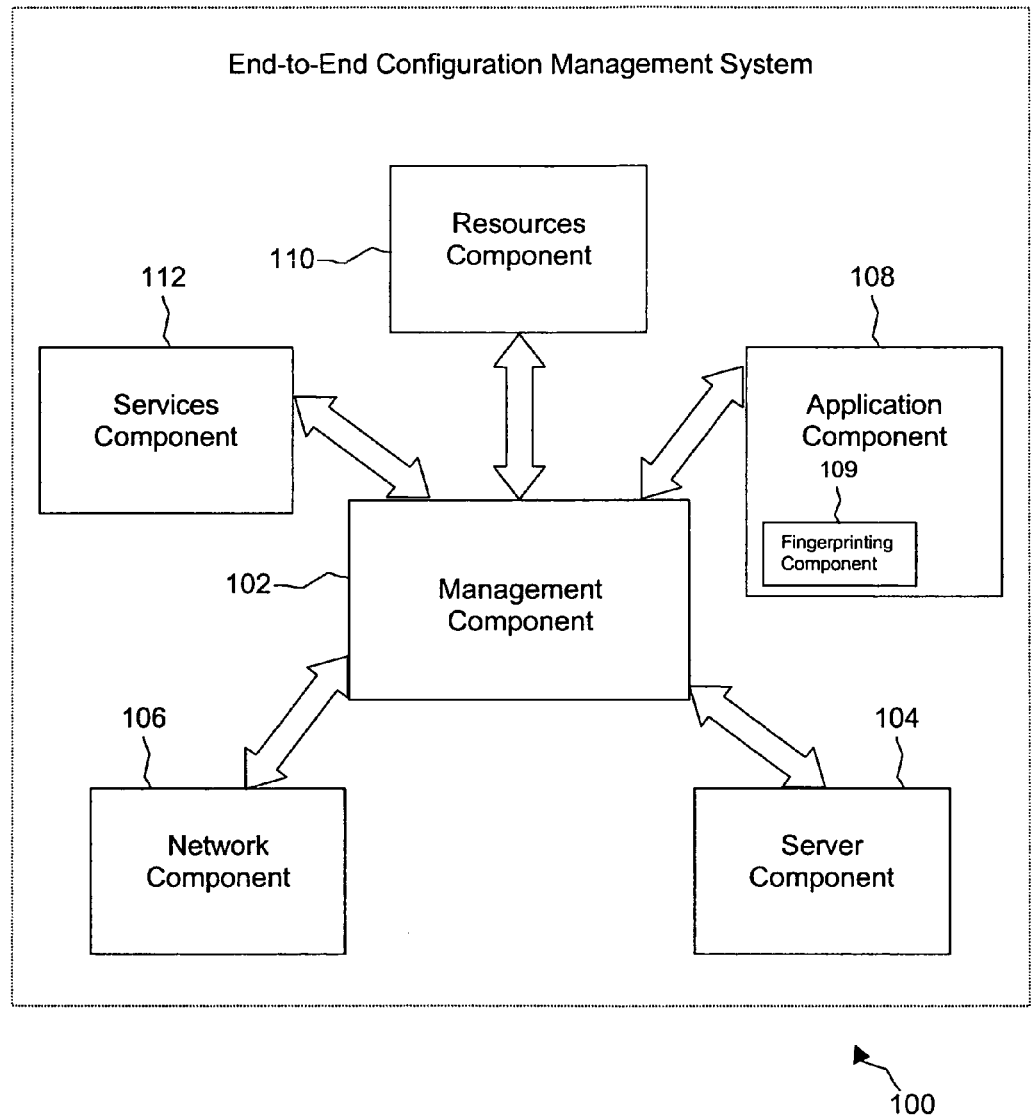
FIG. 1a is a block diagram of an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term data store may refer to various computer-based storage systems, and/or applications such as relational databases, directories, and other storage systems. As mentioned above, the managing of enterprise assets may be challenging. For example, often a user associated with an asset may change jobs or responsibilities. Tracking the user change often includes a significant amount of manual entry to change ownership. Assets include a plurality of associated entities that enable the asset to operate. Moreover, an asset may be stacked, that is the asset may depend on a second asset. Therefore, in some cases, it may be difficult to track a configuration change of the enterprise.

Accordingly, the embodiments discussed below contemplate an end-to-end configuration management system and method for improved identification, inventory, and management of enterprise assets, as well as the relationships between these assets. More specifically, the present disclosure is directed to a system and method for fingerprinting or identifying computer programs and/or applications resident on enterprise systems. The present disclosure is also operable for determining the status of these applications, such as whether they are currently in use or have been used recently. In some instances, such as for licensing purposes, an audit may be conducted to identify all the applications on enterprise systems. Obtaining an accurate count of the total numbers of each application is important, because, for example, there may be penalties for operating applications without the appropriate number of licenses. The fingerprinting system and method disclosed herein is operable for conducting such an audit and identifying enterprise programs or applications. Fingerprinting may include searching for specific files indicative of a particular application. To obtain a greater degree of accuracy and to identify the status of the applications, the fingerprinting system may also analyze directory structures, specific code within application files, memory on enterprise computers, and employ other techniques which are disclosed below. The fingerprinting system and method disclosed herein may be used by different system for different purposes, such as auditing or configuration management. For the purposes of this disclosure, the fingerprinting system is disclosed in operation with a configuration management system. However, the fingerprinting system may be used by or with other system for other purposes, all of which are within the spirit and scope of the present disclosure.

Turning now to FIG. 1a, a system 100 for end-to-end configuration management is depicted. The system 100 includes a management component 102 in communication with a server component 104, a network component 106, an application component 108, a resources component 110, and a services component 112. In an embodiment, the management component 102 may communicate with the server component 104, the network component 106, the application component 108, the resources component 110, and the services component 112 through an optional network (not shown).

The management component 102 operates to identify an end-to-end relationship between one or more enterprise assets. The management component 102 utilizes one or more of the component(s) 104, 106, 108, 110, and 112 to manage relationships between the enterprise assets. The term end-to-end or end-to-end relationships or configuration management, as used herein, may refer to identifying and maintaining relationships and/or associations between at least three or more of the communication network hardware systems and servers, applications residing on the servers, services provided by the applications, and the people that provide support for any of these systems. For example, the management component 102 may identify end-to-end relationships between communication network hardware and one or more servers, applications residing on the servers, services provided by the applications, and the people that provide support for any of these systems. The assets may include, but are not limited to, applications whether commercial-off-the-shelf-software packages, business or other custom applications, any type of services or products provided or supported by the enterprise, human resources including employees and/or contractors, operating systems, server computers, general-purpose computer systems, desktop computers, laptop computers, mobile computing devices, main frame computers, modems, hubs, routers, wireless access points, gateways, switches, firewalls, circuit boards, printers, database management systems, disk drives, tape drives, facsimile machines, scanners, point-of-sale devices, and/or other assets.

Each of the components 104, 106, 108, 110, and 112, represent systems, resources, or processes to mine, identify and/or inventory the enterprise assets. In addition to these components 104, 106, 108, 110, and 112 the management component 102 may include primary, supplemental, or additional systems to identify and inventory assets. The management component 102 and/or its sub-systems may be used in conjunction with the components 104, 106, 108, 110, and 112 to augment or supplement the identification and compilation of asset information. The management component 102 is further operable to cross-reference information obtained from its systems, as well as information produced by these components 104, 106, 108, 110, and 112 to produce a more accurate listing of assets. The management component 102 then maps the relationships of these assets to one another to promote end-to-end enterprise asset management.

The management component 102, after identifying the assets in the manners discussed above, is operable to create any number of maps or relationships amongst and between the assets. For example, after identifying the servers, network components, and applications of the enterprise, the management component 102 may create a map to illustrate the relationships of all applications operating on each of the enterprise servers. The management component 102 is operable to maintain the map of these relationships, such as in a relational database, and provide reports including these relationships which may be presented such as by graphical or pictorial illustrations or otherwise.

In this manner, systems administrators can make informed decisions about applications that will be impacted by upgrading or moving, for example, one or more servers. In a large enterprise, a particular service may be supported by tens or even hundreds of applications residing on numerous servers. By identifying the relationships that exist between the applications and services that they support, when work is being performed on a particular server, the management component 102 can provide a listing of the impacted or related services, via the applications residing on the server. By further mapping the individuals, such as employees and so on, the appropriate individuals may be engaged or notified based on the applications, servers, or services they support or are otherwise related to.

The server component 104 operates to identify the servers in the enterprise. The server component 104 communicates with the management component 102 to provide a list of the servers in the enterprise. In one embodiment, the server component 104 may include a commercial off-the-shelf (COTS) tool such as IBM Tivoli that identifies and maintains an inventory of enterprise servers. Information about enterprise servers may be obtained from other sources as well. For example, the server component 104 may actively scan the enterprise for servers, or a local component, such as a computer program, may be provided on each server to obtain and report on server details.

Server information may be obtained from other sources including manually entered lists identifying enterprise servers, such as spread sheets and other tracking and identification methods. When information is manually entered, problems arise with regard to integrity of the data entry. For example, server serial numbers or other server data may be incorrectly typed or entered which may cause problems. In one embodiment, the server component 104 obtains information about the enterprise servers in the various ways and from the various sources, such as, but not limited to, those listed above and provides and/or makes this information available to the management component 102.

The network component 106 operates to identify communication hardware of the enterprise. The communication hardware may include assets such as routers, hubs, wireless access points and/or other assets. In an embodiment, the network component 106 may include a product, such as Cisco Works by Cisco, operable for scanning the enterprise for communication hardware. The network component 106 reports the presence of the communication hardware assets to the management component 102. The network component 106 may continuously update the management component 102 of the presence of the assets or may provide periodic reports. In some embodiments, the network component may employ multiple products or systems to identify network resources. For example, in addition to Cisco Works, other systems or products, such as Visonael by Visonael Corp., may be employed for detecting the communication hardware assets and reporting to the management component 102. In addition to routers, hubs, and telecommunication infrastructure components, the information collected from these systems or products about the network communication hardware assets may include, for example routing tables that enables determination of relationships, dependencies, and/or information flow among assets. The information collected by the network component 106 is communicated or made available to the management component 102.

The application component 108 operates to identify applications of the enterprise, including both third party COTS applications and custom business applications. In an embodiment, the application component 108 includes or interfaces with an Enterprise Development Process tool or EDP tool that maintains information about the enterprise's custom business applications. Additional information about EDP is provided in the patent applications for "Defining and Sizing Feasible Approaches to Business Needs within an Integrated Development Process", and for "Method For Discovering Functional and System Requirements In An Integrated Development Process" which are incorporated by reference above.

The application component 108 may also identify applications using tools such as HP Service Desk by Hewlett Packard, or other COTS tools. As applications are added to or removed from the enterprise, the system users update HP Service Desk appropriately. However, these users may fail to update HP Service Desk with changes to the status of applications in a timely manner, or may completely fail to update the system, such as when they forget. Also, individuals may fail to type in the correct application information. Thus, there are drawbacks to many of the individual identification systems.

A means that has previously been used to identify the applications that are in use within an enterprise is for an automated inventory agent to search a computing system for the executable files associated with the applications. If the executable files are found, the corresponding applications might be assumed to be active on the computing system. As used herein, the term 'active' refers to an application that is available for execution on a given computing system but that may not necessarily be executing at a given time on that computing system.

There are several drawbacks to inventorying active applications by searching for and counting executable files. For example, different versions of an application might use the same executable file so it may not be possible to identify versions of applications. For example, the only difference between versions of an application may be the files associated with the application, such as DLL files, COM files, bin files, hash files, and/or other files. Since there is only one executable file for the different versions, an inventory agent that counts executable files might count the different versions of such an application as a single application when they should be counted as separate applications, or vice versa. Also, some applications, such as Oracle applications, might use only binary files and may not use what is commonly referred to as an executable file. An inventory agent that counts only executable files might overlook such applications.

Another disadvantage to using a count of executable files as a count of active applications can arise when multiple copies of an executable file are maintained but are not necessarily in use. For example, an enterprise might keep backup copies of the files needed for the installation of an application in a secure file folder. The files in the backup location may never be executed or used from that location or folder. When the application is to be installed for execution on a desktop computer, an administrator might copy the files from that folder rather than from a CD. An automated inventory agent might count the executable file in the file folder and the executable file on the desktop as two applications, but for licensing purposes it may be appropriate to count only the executable file on the desktop, since it is the only application in use.

In addition, situations could arise where an executable file for an application is present on a computer but other associated files needed to execute the application are not present. Since the application cannot execute, it typically should not be counted for licensing purposes. An automated inventory agent, however, might find the executable file for the application, consider the application to be active, and count the application in an inventory.

In an embodiment of the present disclosure, fingerprinting of applications is conducted to aid in the inventorying of active applications within an enterprise. Fingerprinting may be defined as the specification of a set of parameters that, when present, indicate that an application is active. A fingerprint may be defined as the set of parameters. Automated algorithms, such as computer programs or scripts, can be written to search for the fingerprints of different applications.

If the fingerprint of an application is found, that application can be considered active. It should be appreciated, however, that the present system may still identify and create a log of files in backup directories, and so on, but will identify these as backup copies for licensing or other purposes.

Applications for which fingerprints can be created can be placed in one of two categories, internal applications and third-party applications. Internal applications are those applications that are created by development staff under the control of an enterprise rather than purchased off the shelf or from outside the enterprise. Since an enterprise would typically have control over the parameters of such applications, the creation of fingerprints for such applications can be planned. For example, the enterprise might require that a fingerprint file be created for every internal application. The fingerprint file might contain information such as an identification code for the application, a version number for the application, a build number for the application, and the identity of any other applications that are dependent on the internal application or that the internal application is dependent on. The entity might require that the fingerprint file be updated when any of these parameters changes. When an inventory is to be made of internal applications, the fingerprint files can simply be read to determine the identities and characteristics of the active internal applications. These fingerprint files may be commonly named to simplify the process of locating the files, or the file names may be provided to the fingerprinting system. A fingerprinting component 109 within the application component 108 can aid in identifying and reading of the fingerprint files.

Defining and searching for fingerprints for third-party, or COTS, applications can be more complicated since an enterprise typically does not have control over the parameters for such applications. In an embodiment, the fingerprinting component 109 is operable for defining additional fingerprints for applications and operable for searching for the additional fingerprints. These additional fingerprints may deal with files associated with an application, the file directory structure in which an executable file and/or the associated files are located, the presence in memory of data related to an application, and modifications of data related to an application. Examples of additional files include files created during the installation or execution process, and may help to distinguish from uninstalled or unexpected backups or archived copies.

The files associated with an application can be used to locate as well as to provide an indication that the application is active. For example, DLL files, COM files, bin files, hash files and other associated files might be needed by an application for the application to execute properly. The presence of a certain combination of these associated files can suggest that the application is active, and the absence of that combination can suggest that the application is not active. In an embodiment, a first fingerprint can be defined for a first COTS application based on a first combination of associated files that is likely to indicate that the application is active. For a second application, a second fingerprint consisting of a second combination of associated files can be defined, and so on. After the fingerprints have been defined, the fingerprinting component 109 can search for the fingerprints and if a fingerprint is found, the application having that fingerprint can be considered active. Searching for associated files in this manner can allow applications that do not use executable files, such as Oracle applications, to be counted as active when appropriate and can allow applications that are inactive even though their executable file is present on a computer to be counted as inactive.

The file directory structure in which an executable file or associated files are located can also provide an indication of whether an application is active. An active version of an application might be likely to be located in a particular file structure while an inactive version of the application might be likely to be located in a different file structure. For example, an active copy of an application and a backup copy of the application may have the same underlying directory or file structure but this underlying structure may be installed under a different high-level directory or file folder in each case. An uninstalled version of an application may be kept under a single directory or may retain the application's underlying expanded directory structure for ease of reinstallation but be located under yet another high-level file folder, such as under a "backup" folder. In an embodiment, a fingerprint can be defined for an application based on the directory structure that is most likely to indicate that the application is active. The fingerprinting component 109 can then examine the directory structures of an enterprise's COTS applications and attempt to find a directory structure that matches the fingerprint. A matching fingerprint can be taken as an indication of an active application.

The presence in memory of an application or data related to an application can provide another indication of whether an application is active. Data related to an active application would be likely to be present in a computer's memory at some point in time while inactive applications would be unlikely to be found in memory. In an embodiment, a fingerprint can be defined for an application based on the application-related data that is likely to be found in memory when the application is active. The fingerprinting component 109 can search the memory of one or more computers to determine if the fingerprint is present. The search of memory may include looking for information related to the application, such as some or all of the application's executable, or other related files or data. If the fingerprint is found, the application can be considered active.

Certain application might execute only at certain times and therefore data related to an active application may not always be present in memory. The fingerprinting component 109 may overlook an active application if the fingerprinting component 109 happens to search for the application's fingerprint in memory at a time when the application is not executing. In an embodiment, the times at which the fingerprinting component 109 performs its memory search can be varied to lessen the likelihood that application-related data in memory might be overlooked. In an embodiment, a designation may be made of the number of times that the fingerprinting component 109 can fail to find application-related data in memory before the application is considered to be inactive. For example, if the fingerprinting component 109 conducts five memory searches at differing times and does not find the application-related data in any of the searches, the application might be considered inactive.

The modification of data related to an application can provide yet another indication of whether an application is active. During the course of their execution, some applications might modify the data in a database or other data store. Recent modifications to a data store can indicate that an application that interacts with that data store is active. A data store that has not been modified for an extended period of time can be an indicator that an application associated with the data store might have been active at some point, but is no longer active. In an embodiment, a fingerprint can be defined for an application based on the dates of last modification or types of modifications to a data store that are most likely to indicate that the application is active. The fingerprinting component 109 can search the data store for last time it was modified or the specified types of modifications and if the fingerprint is found the application can be considered active. Identifying an inactive application may prompt an administrator, for example, to remove the unused application, which reduces the number of licenses needed for the application and the cost to the enterprise.

In various embodiments, the above-described fingerprints might be used alone or in various combinations or sequences. For example, an enterprise might first search for the associated files for an application. If the appropriate associated files are not found, the application may be considered inactive. If the appropriate associated files are found, the enterprise might then examine the file or directory structure. If a directory structure suggesting the application is active is not found, the application may be considered inactive. If a directory structure suggesting the application is active is found, the enterprise might then conduct a memory search. If data related to the application is not found in memory after a specified number of searches, the application may be considered inactive. If data related to the application is found in memory, the application may be considered active. Other combinations or sequences of fingerprinting activities will present themselves to one of skill in the art.

Another method for identifying applications is to search for residual files, such as files other than the main executable used to run the application. These may be data, executable, preference, graphics, sound or other media files, support or files other than the main executable of the application. Version information may be maintained in certain of these files, or information about an application may also be determined based on the name of a particular file related to the application. Other information about these files may be analyzed including the file size, the file checksum, or the contents of embedded header information in specific files. The actual content of a file, such as an executable, help, or other application files, may include version and other information useful for various purposes. According to one embodiment, the present disclosure is operable to identify and read all or some portions of certain application file(s) as part of the fingerprint for application.

Applications may also generate temporary or other files, such as for file swapping, during operations. Often the applications do not clean up after themselves completely and these files remain on the system even when the application is no longer being used. By scanning for these files, it may be possible to determine whether the application has actually been in use on the particular computer, and by analyzing the dates of these files, it may be possible to determine when the last time the application was used. Other file information or analysis may be conducted, which will suggest themselves to one skilled in the art. Furthermore, by combining directory tree and various types of residual file analysis, more applications and their actual status may be identified. The disclosed techniques may be otherwise combined or combined with other known techniques which will readily suggest themselves to one skilled in the art based on the teachings of this disclosure.

In one embodiment, any of the various systems may be run daily to obtain an up-to-date picture of enterprise assets. For example, components on the servers may periodically report about the status of the server upon which they operate. Servers recently removed from service would not be reported on and, perhaps after cross-checks, the inventory of servers would be updated noting the server was eliminated or no longer in service. Likewise, applications that were recently added would be identified by, for example, a nightly check by the fingerprinting component. These newly added applications would be added to the applications inventory.

The resources component 110 operates to identify human resources of the enterprise. Human resources may be associated with a plurality of assets. For example, a mobile device may include an associated human resource with an identification, such as an IP address, a phone number, a MAC address, and/or email address. The resources component 110 identifies people and the management component 102 may then cross-reference these human resources with other enterprise assets. The resources component 110 may provide data, such as addresses, social security numbers, and/or other information to the management component 102, or perhaps the resources component 110 may only provide the location information, such as a pointer, to allow the management component 102 to access the data. The resources component 110 may include or obtain information from other systems, such as the enterprise's human resource system, or the EDP tool. Other systems and techniques for identifying and maintaining accurate and up-to-date information on human resources may be found in the patent application entitled "Application Management Database with Personnel Assignment and Automated Configuration Application" which is incorporated by reference above.

Various examples for identifying human resources may be employed by the resources component 110. For example, a trend analysis of login sessions may be conducted to associate a specific user with a desktop, for example based on the user logging into the desktop three times in a row. The employment of login trend analysis may prevent a one-time user from being incorrectly associated with a system. In an embodiment, trend analysis of logins may be used on other assets, also, to associate an individual with the assets. In an embodiment, trend analysis of logins may be performed by an agent or a software component that executes on the subject asset, for example a desktop computer or a laptop computer, and communicates back to the asset management repository automated tool The services component 112 identifies services of the enterprise. Services may include any product, service, or other offering supported by the business enterprise. The services component 112 may include or access one or more tools identifying all the services of the enterprise. Some of these tools may rely on manual entry to provide a listing of enterprise services. The EDP tool may include organizational and procedural components for managing projects, such as software application projects, and include details regarding some of the enterprise products and/or services.

Figure 1B:
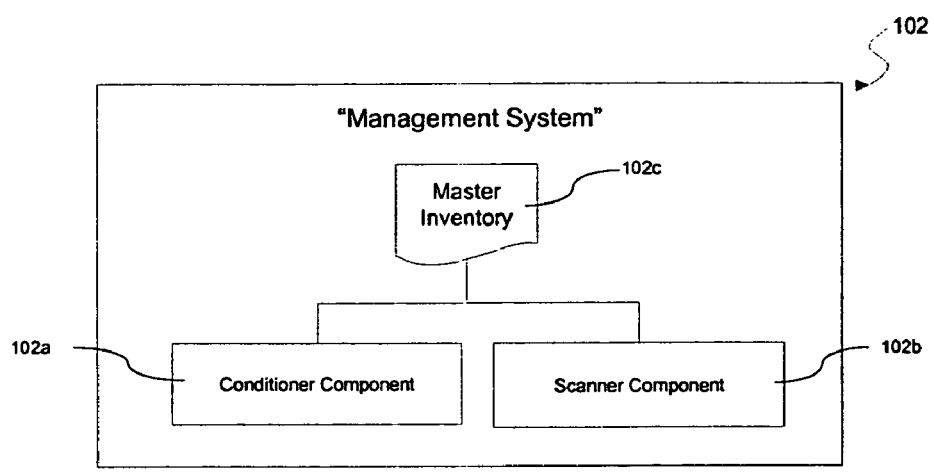
FIG. 1b is a block diagram of a management system according to one embodiment of the present disclosure.

Turning now to FIG. 1b, a block diagram depicts one embodiment of the management component 102. The management component 102 includes a conditioner 102a, and a scanner component 102b. In an embodiment, the conditioner component 102a communicates with one or more of the component(s) 104, 106, 108, 110, and 112 to establish an inventory of the enterprise assets. The conditioner component 102a provides asset inventory information to form a master inventory list 102c. In some embodiments, the master inventory list 102c may be numerous files, databases, data stores, or systems whereby access to complete enterprise inventory information may be obtained, accessed, or aggregated.

The scanner component 102b may include supplemental scanning components or capabilities, such as the enhanced fingerprinting component. Systems of the scanner component 102b may be used as primary sources or in addition to the component(s) 104, 106, 108, 110, and 112 to establish the inventory of the enterprise assets. The conditioner component 102a is operable to use information obtained on the enterprise assets from the components 104, 106, 108, 110, and 112 in combination with the additional information obtained from the scanner component 102*b* to obtain information on the enterprise assets that may be more comprehensive and accurate. Further, the management component 102 may leverage this information to further improve the information on enterprise assets and their relationships. For example, identification of a service, such as new service for a wireless telephone, may be related, such as in the EDP tool, to hundreds of applications which can be associated with the particular service. The applications identified by the application component 108 can be cross-referenced to the listing of applications associated with the services to augment and improve the inventory of applications.

As another example, the applications information includes information about the servers upon which the applications operate, and vice versa. The server inventory can be verified and refined by cross-referencing it with the server-related information obtained as part of the applications information. Cross-referencing this same information may also be beneficial to ensure that all server-application relationships appear accurate. There are numerous other examples of ways that this information may be used to verify, update, and augment the enterprise assets data and other examples will readily suggest themselves to one of skill in the art.

For example, where nightly scanning is conducted, it might be found that certain applications are accounted for, but certain servers, such as Server A, no longer exist. Information about the applications that are known to be on Server A might be consulted. Where the applications were identified by the nightly scan, it might be assumed that the scan of Server A failed for some reason, but that Server A is still operational and other inquiries might be made before considering Server A off-line or out of service. Conversely, if no information on the applications known to have been on Server A was identified during the nightly scan, this might support that Server A is out of service, since the server scan had similar results.

As another example, a particular directory tree configuration identified with regard to an application might be indicative of a particular operating system, such as Unix, on a particular server. However, the server information might suggest another operating system is present on the particular server. In such a circumstance, it may be impossible for the management component 102 to resolve this conflicting data and additional research or information may be needed. In the event of conflicting information, such as in the prior example, one solution is to provide degrees of confidence related to the enterprise asset data. For example, higher degrees of confidence might be assigned to assets where all the data is in agreement, while lower degrees of confidence might be assigned where conflicting data exists.

The management component 102 is therefore able to maintain accurate maps of the relationships between all the enterprise assets. Such relationships may be included in the master inventory 102*c* to provide greater relational detail. This information may be used, for example, by a systems administrator that needs to upgrade a server. The relationship data may be used to identify the appropriate manager responsible for applications on the server to be upgraded, as well as notifying parties that will be impacted by any accompanying service disruptions. The management component 102 is operable to maintain complete information on enterprise assets and their relationships, from end-to-end.

Figure 1C:
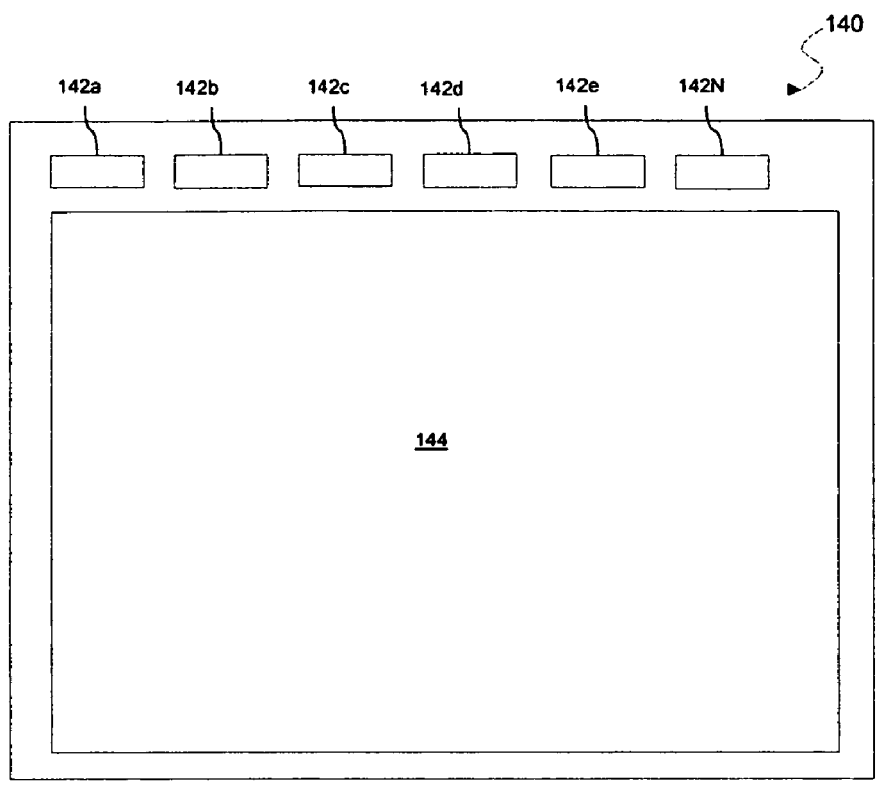
FIG. 1c illustrates one embodiment of a graphical user interface adapted for providing end-to-end configuration management according to another aspect of the present disclosure.

The management component 102 described above may be operated with a graphical user interface (GUI) 140 as illustrated in FIG. 1*c*. The GUI 140 may operate on a general-purpose computer, which is discussed in greater detail below, and/or other enterprise assets. The GUI 140 may be operated through a web browser, and/or other customized user interface. The GUI 140 may also be adapted for viewing and/or editing one or more end-to-end configurations collected and/or modified by the management system 102. The GUI 140 includes buttons 142*a*, 142*b*, 142*c*, 142*d*, 142*e*, . . . 142N, and holistic interface view 144.

The buttons 142*a*, 142*b*, 142*c*, 142*d*, 142*e*, . . . 142N may be adapted for observing specific end-to-end enterprise asset relations, cut and paste of information, saving information, scheduling installation and/or removal of applications, and/or other functions. The buttons 142*a*, 142*b*, 142*c*, 142*d*, 142*e*, . . . 142N may include a touch-pad and/or may be located within a display (e.g., liquid crystal display), in one embodiment.

The holistic interface view 144 includes information provided by the end-to-end configuration management system 100. For example, the holistic interface view 144 may include a log depicting end-to-end relations between services, applications, servers, and/or people. Of course, the holistic interface view 144 may also include other information that may be associated with the activity of the management system 102, and/or other enterprise assets. It is also understood that the holistic interface view 144 provides real-time global enterprise end-to-end configuration management, which may employ COTS tools and/or other customized tools that operate in conjunction with the GUI 140.

Figure 2:
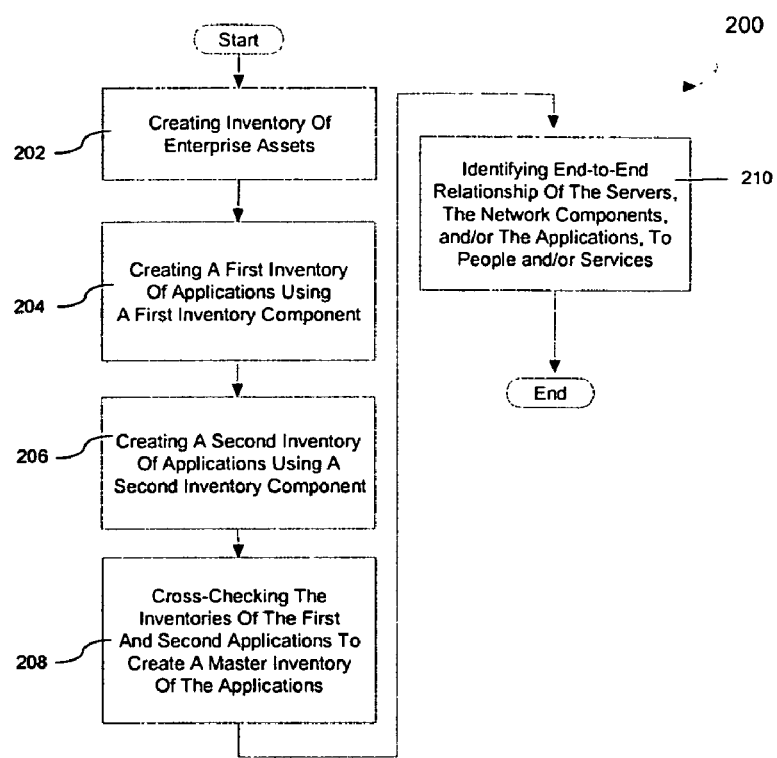
FIG. 2 is a flow chart of a method for providing end-to-end configuration management according to one embodiment of the present disclosure.

Turning now to FIG. 2, a flow chart illustrates a method 200 for providing end-to-end configuration management. In block 202, the management system 102 invokes or refers to the first inventory component, such as one or more of the components 104, 106, 108, 110, and 112, and creates an inventory of one or more of the servers, applications and network components and so on. The inventory may be stored in the master inventory 102*c* or may be stored on other assets of the enterprise.

The method proceeds to block 204, where the first inventory component creates a first inventory of the applications. The first inventory component may include COTS tools such as HP Service Desk and/or other customized tools adapted for generating lists of enterprise assets.

The method proceeds to block 206 where the second inventory component, such as the scanner 102*b*, creates a second inventory of, for example, the enterprise applications. The inventory may include scanning for specific executable files, preference files, directory trees, version files, and/or other information.

At block 208, the first and the second inventory of the applications are cross-checked by the conditioner 102*b* and aggregated to create the master inventory 102*c*. In this block, the cross-checking may be with other inventories, such as servers, services, human resources, and so on.

At block 210, end-to-end relationships are established between the servers 124, the network components, the applications, the services, and/or human resources. The master inventory 102*c* thereby provides a global relationship between the assets of the enterprise. The method then ends.

Figure 3:
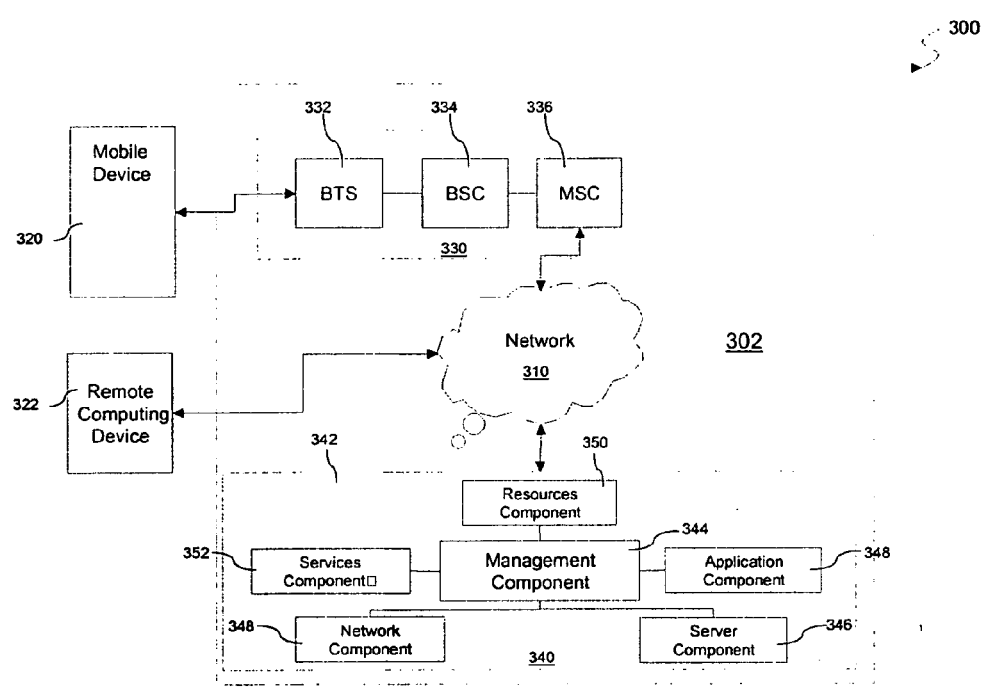
FIG. 3 illustrates an exemplary system suitable for implementing the several embodiments of the present disclosure.

Turning now to FIG. 3, a system 300 is depicted that illustrates the environment in which the management component 102 operates and examples of the enterprise resources which may be identified and monitored. The system 300 includes an information technology (IT) infrastructure 302, a mobile device 320, and a remote computing device 322. The mobile device 320 and the remote computing device 322 are in communication with the IT infrastructure 302 through a network 310. The mobile device 320 and the remote computing device 322 receive calls from the end-to-end configuration management system 340 through the IT infrastructure 302.

The IT infrastructure 302 communicates with a wireless network 330, the network 310, and the end-to-end configuration management system 340. In one embodiment, the end-to-end configuration system 340 may be substantially similar to the system 100 of FIG. 1.

The network 310 provides the communications link between the end-to-end configuration management system 340, the mobile device 320, and the remote computing device 322. The network 310 may be the Internet, an intranet, extranet, an enterprise network, or combinations thereof. It is contemplated that the system 300 may be employed to implement the management enterprise assets of the end-to-end configuration management system 340. In an embodiment, the network 310 may include the Internet, a public switched telephone network (PSTN), and/or other networked systems.

The wireless network 330 may comprise a transceiver in wireless radio communication with the mobile device 320, a bridge node liking to the network 310, such that the transceiver is in communication with the bridge node, in an embodiment.

In one embodiment, a base transceiver station (BTS) 332 is in radio communication with the mobile device 320, a mobile switching center (MSC) 336 bridges the wireless network 330 to the network 310, and a base station controller (BSC) 334 links the BTS 334 with the MSC 336.

In another embodiment, the BTS 332 is in radio communication with the mobile device 320, a gateway global packet radio system support node (GGSN) bridges the wireless network 330, a base station controller (BSC) 334 links the BTS 332 to a serving global packet radio system support node (SGSN), and the SGSN is in communication with the GGSN.

Other wireless network topologies are also possible. The construction of information technology systems is well understood by those skilled in the art. The system 300 employs the IT infrastructure 302 merely as a link between the mobile device 320, the remote computing device 323, and the end-to-end configuration management system 340.

Figure 4:
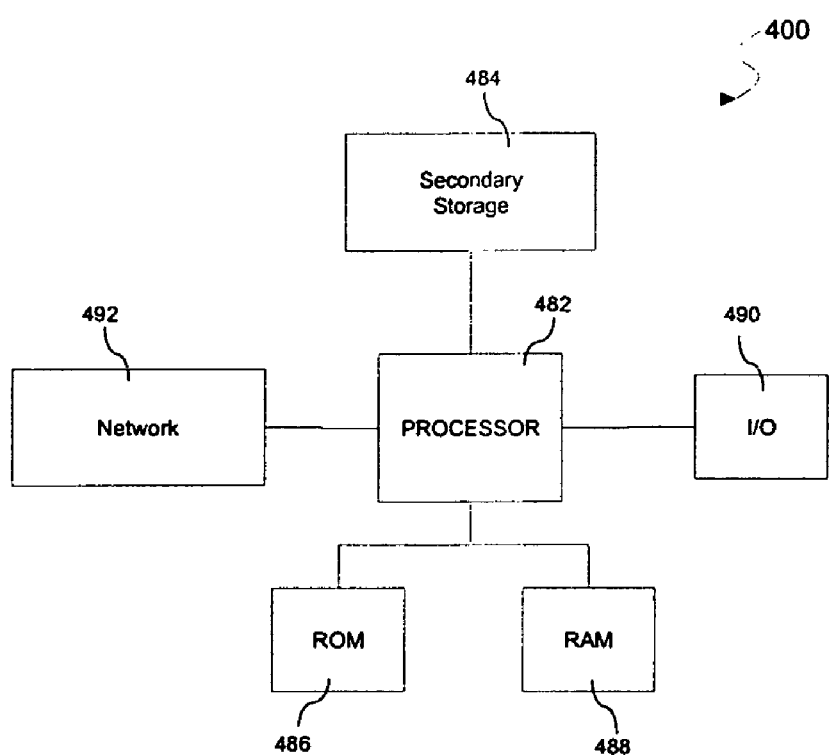
FIG. 4 illustrates an exemplary general-purpose computer system suitable for implementing the several embodiments of the present disclosure.

The system 100, GUI 140, and IT system 300 described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) 490 devices, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O 490 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 492 devices may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity 492 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for identifying whether applications are active in a computing system of an enterprise, the method comprising:
   defining and storing, by a computer device, a first plurality of fingerprints associated with a plurality of internal applications, wherein each of the first plurality of fingerprints comprises an identification code, a version number, and a build number, and wherein the plurality of internal applications are created by development staff within the enterprise;
   defining and storing, by the computer device, a second plurality of fingerprints associated with a plurality of third party applications, wherein the second plurality of fingerprints comprise directory structures, files associated with the plurality of third party applications, times of last modification of one or more data stores associated with the plurality of third party applications, and types of modification of data in one or more data stores associated with the plurality of third party applications;
   determining whether applications are internal applications or third party applications;
   in response to determining that the applications are internal applications, searching, by the computer device, the computing system for fingerprints of the first plurality of fingerprints associated with the applications;
   identifying the applications as active when the fingerprints of the first plurality of fingerprints are found;
   in response to determining that the applications are third party applications, searching, by the computer device, the computing system for fingerprints of the second plurality of fingerprints associated with the applications, wherein the searching for the fingerprints of the second plurality of fingerprints comprises:
      searching a plurality of directory structures of the computing system for the directory structures in the fingerprints of the second plurality of fingerprints;
      searching a plurality of files of the computing system for the files associated with the applications in the fingerprints of the second plurality of fingerprints;
      searching memory of the computing system for the data in the fingerprints of the second plurality of fingerprints in a predefined threshold number of searches, wherein the predefined threshold number of searches is greater than one;
      searching one or more data stores of the computing system associated with the applications for the times of last modification in the fingerprints of the second plurality of fingerprints; and
      searching one or more data stores of the computing system associated with the applications for the types of modification of data in the fingerprints of the second plurality of fingerprints; and
   identifying the applications as active when a plurality of:
      one or more of the directory structures in the fingerprints of the second plurality of fingerprints is found, one or more of the files in the fingerprints of the second plurality of fingerprints is found, one or more of the data in the fingerprints of the second plurality of fingerprints is found in one of the predefined threshold number of searches, one or more of the times of last modification in the fingerprints of the second plurality of fingerprints is found, and one or more of the types of modification of data in the fingerprints of the second plurality of fingerprints is found.

2. The computer implemented method of claim 1, wherein the files associated with the plurality of third party applications in the second plurality of fingerprints comprise one or more of executable files, DLL files, COM files, binary files, and hash files.

3. The computer implemented method of claim 2, wherein each the directory structures in the second plurality of fingerprints is further defined as a certain hierarchy of file folders.

4. The computer implemented method of claim 1, wherein any one of the searching that comprises the searching for the fingerprints of the second plurality of fingerprints is dependent upon another searching that comprises searching for fingerprints within the second plurality of fingerprints.

5. The computer implemented method of claim 1, wherein searching the computing system for a first of the second plurality of fingerprints associated with a first of the plurality of third party applications comprises:
   searching a plurality of files of the computing system for one or more files in the first of the second plurality of fingerprints; and
   in response to finding the one or more files in the first of the second plurality of fingerprints, searching a plurality of directory structures of the computing system for a directory structure in the first of the second plurality of fingerprint.

6. The computer implemented method of claim 5, further comprising:
   in response to finding the directory structure in the first of the second plurality of fingerprints, searching memory of the computing system for data in the first of the second plurality of fingerprints in the predefined threshold number of searches.

7. The computer implemented method of claim 1, wherein the searching the computing system for the fingerprints of the second plurality of fingerprints occurs at different times each day.

8. The computer implemented method of claim 1, wherein the searching the computing system for the fingerprints of the second plurality of fingerprints occurs at different times on different days.

9. The computer implemented method of claim 1, further comprising determining versions of the plurality of third party applications based on the second plurality of fingerprints.

10. A computer system for identifying whether applications are active in a computing system of an enterprise, the system comprising:
   at least one processor; and
   a memory storing computer executable instructions that, when executed, cause the at least one processor to:
      define and store a first plurality of fingerprints associated with a plurality of internal applications, wherein each of the first plurality of fingerprints comprises an identification code, a version number, and a build number, and wherein the plurality of internal applications are created by development staff within the enterprise;
      define and store a second plurality of fingerprints associated with a plurality of third party applications, wherein the second plurality of fingerprints comprise directory structures, files associated with the plurality of third party applications, times of last modification of one or more data stores associated with the plurality of third party applications, and types of modification of data in one or more data stores associated with the plurality of third party applications;

determine whether applications are internal applications or third party applications;

in response to determining that the applications are internal applications, search the computing system for fingerprints of the first plurality of fingerprints associated with the applications;

identify the applications as active when the fingerprints of the first plurality of fingerprints are found;

in response to determining that the applications are third party applications, search the computing system for fingerprints of the second plurality of fingerprints associated with the applications, wherein the search for the fingerprints of the second plurality of fingerprints further configures the at least one processor to:

search a plurality of directory structures of the computing system for the directory structures in the fingerprints of the second plurality of fingerprints;

search a plurality of files of the computing system for the files associated with the applications in the fingerprints of the second plurality of fingerprints;

search memory of the computing system for the data in the fingerprints of the second plurality of fingerprints in a predefined threshold number of searches, wherein the predefined threshold number of searches is greater than one;

search one or more data stores of the computing system associated with the applications for the times of last modification in the fingerprints of the second plurality of fingerprints; and search one or more data stores of the computing system associated with the applications for the types of modification of data in the fingerprints of the second plurality of fingerprints, and identify the applications as active when a plurality of: one or more of the directory structures in the fingerprints of the second plurality of fingerprints is found, one or more of the files in the fingerprints of the second plurality of fingerprints is found, one or more of the data in the fingerprints of the second plurality of fingerprints is found in one of the predefined threshold number of searches, one or more of the times of last modification in the fingerprints of the second plurality of fingerprints is found, and one or more of the types of modification of data in the fingerprints of the second plurality of fingerprints is found.

11. The computer system of claim 10, further comprising HP Service Desk, wherein HP Service Desk is used as an additional tool for identifying applications in the computing system.

12. The computer system of claim 10, further comprising an enterprise development process, wherein the enterprise development process is an additional tool for identifying applications in the computing system.

13. The computer system of claim 10, wherein the system for identifying applications in the computing system is a component in a system for end-to-end configuration management in the computing system.

14. The computer method of claim 10, wherein the files associated with the plurality of third party applications in the second plurality of fingerprints comprise one or more of executable files, DLL files, COM files, binary files, and hash files.

15. The computer system of claim 10, wherein each of the directory structures in the second plurality of fingerprints is further defined as a certain hierarchy of file folders.

16. The computer system of claim 10, wherein each of the first plurality of fingerprints further comprises a dependency between applications.

17. The computer system of claim 16, wherein the dependency between applications comprises at least one of a dependency of one of the plurality of internal applications on another application and a dependency of another application on one of the plurality of internal applications.

18. A non-transitory computer readable medium including program instructions for identifying whether applications are active in a computing system of an enterprise, the program instructions, when executed by a processor, cause the processor to:

define and store a first plurality of fingerprints associated with a plurality of internal applications, wherein each of the first plurality of fingerprints comprises an identification code, a version number, and a build number, and wherein the plurality of internal applications are created by development staff within the enterprise;

define and store a second plurality of fingerprints associated with a plurality of third party applications, wherein the second plurality of fingerprints comprise directory structures, files associated with the plurality of third party applications, times of last modification of one or more data stores associated with the plurality of third party applications, and types of modification of data in one or more data stores associated with the plurality of third party applications;

determine whether applications are internal applications or third party applications;

in response to determining that the applications are internal applications, search the computing system for fingerprints of the first plurality of fingerprints associated with the applications;

identify the applications as active when the fingerprints of the first plurality of fingerprints are found;

in response to determining that the applications are third party applications, search the computing system for fingerprints of the second plurality of fingerprints associated with the applications, wherein the search for the fingerprints of the second plurality of fingerprints further causes the processor to:

search a plurality of directory structures of the computing system for the directory structures in the fingerprints of the second plurality of fingerprints;

search a plurality of files of the computing system for the files associated with the applications in the fingerprints of the second plurality of fingerprints;

search memory of the computing system for the data in the fingerprints of the second plurality of fingerprints in a predefined threshold number of searches, wherein the predefined threshold number of searches is greater than one;

search one or more data stores of the computing system associated with the applications for the times of last modification in the fingerprints of the second plurality of fingerprints; and search one or more data stores of the computing system associated with the applications for the types of modification of data in the fingerprints of the second plurality of fingerprints, and identify the applications as active when a plurality of: one or more of the directory structures in the fingerprints of the second plurality of fingerprints is found, one or more of the files in the fingerprints of the second plurality of fingerprints is found, one or more of the data in the fingerprints of the second plurality of fingerprints is found in one of the predefined threshold number of searches, one or more of the times of last modification in the fingerprints of the second plurality of fingerprints is found, and one or more of the types of modification of data in the fingerprints of the second plurality of fingerprints is found.

19. The computer program product of claim 18, wherein the files associated with the plurality of third party applications in the second plurality of fingerprints comprise one or more of executable files, DLL files, COM files, binary files, and hash files.

20. The computer program product of claim 18, wherein each the directory structures in the second plurality of fingerprints is further defined as a certain hierarchy of file folders.

* * * * *